（12） United States Patent
Starkey et al.

(10) Patent No.: US 7,771,300 B2
(45) Date of Patent: Aug. 10, 2010

(54) DEVICES FOR ELECTRICALLY ASSISTING AND ACTUATING CONTINUOUSLY VARIABLE TRANSMISSIONS

(75) Inventors: John M. Starkey, West Lafayette, IN (US); Enrico N. Manes, West Lafayette, IN (US); Benjamin J. Rumley, Fakenham (GB)

(73) Assignee: Purdue Research Foundation, West Lafayette, IN (US)

( * ) Notice: Subject to any disclaimer, the term of this patent is extended or adjusted under 35 U.S.C. 154(b) by 931 days.

(21) Appl. No.: 11/415,391

(22) Filed: May 1, 2006

(65) Prior Publication Data

US 2006/0264279 A1    Nov. 23, 2006

Related U.S. Application Data

(60) Provisional application No. 60/676,904, filed on May 2, 2005.

(51) Int. Cl.
  *F16H 61/32*  (2006.01)
  *F16H 55/00*  (2006.01)
  *F16H 63/00*  (2006.01)

(52) U.S. Cl. .............................. 474/14; 474/12; 474/11

(58) Field of Classification Search ............. 474/11–14, 474/18, 36, 40, 103, 110, 43, 70
See application file for complete search history.

(56) References Cited

U.S. PATENT DOCUMENTS

| 197,472 | A |   | 11/1877 | Hunt |   |
|---|---|---|---|---|---|
| 2,184,395 | A | * | 12/1939 | Morse | 474/11 |
| 2,400,294 | A | * | 5/1946 | Firth et al. | 474/36 |
| 2,532,124 | A | * | 11/1950 | Eaton | 474/40 |

(Continued)

FOREIGN PATENT DOCUMENTS

EP    319035 A1 *  6/1989

(Continued)

OTHER PUBLICATIONS

F. W. Heilich et al., *Traction Drives:Selection and Application*, Marcel Dekker, Inc., © 1983, pp. 6-7, 12-13, 16-17, 20-27, 30-49, 52-53, 56-61, 66-69, 74-75, 108-109.

(Continued)

*Primary Examiner*—Robert A Siconolfi
*Assistant Examiner*—Stephen Bowes
(74) *Attorney, Agent, or Firm*—William F. Bahret (57) ABSTRACT

An electrically assisted or actuated continuously variable transmission (CVT) with a first pulley having a first pulley portion for fixed connection to an engine shaft and an axially movable second pulley portion for placement about the engine shaft. A mechanism for assisting a mechanically-actuated CVT includes a nut connected to the movable portion and an electric motor having a screw that is engaged with the nut. The nut is moved axially by rotation of the screw with respect to the nut, assisting mechanical actuators in changing axial spacing between the pulley portions. A variable actuator for actuating a CVT includes a pair of disks coaxially engaged with the pulley portions, and a roller for contacting the disks at varying inclinations. An electric motor tilts the roller along the axis of rotation, causing the disks to rotate at differing rates to effect a change in axial spacing between the pulley portions.

19 Claims, 6 Drawing Sheets

U.S. PATENT DOCUMENTS

| | | | | |
|---|---|---|---|---|
| 2,611,277 | A * | 9/1952 | Mitchell | 474/36 |
| 2,754,691 | A * | 7/1956 | May | 474/28 |
| 2,884,810 | A * | 5/1959 | Chapman | 475/211 |
| 3,571,884 | A * | 3/1971 | Chung | 474/40 |
| 3,776,053 | A * | 12/1973 | Segerstad | 474/14 |
| 4,811,225 | A | 3/1989 | Petzold et al. | |
| 4,838,834 | A * | 6/1989 | Miyata | 474/11 |
| 5,527,225 | A * | 6/1996 | Dick | 474/12 |
| 5,662,538 | A * | 9/1997 | Wang | 474/11 |
| 5,860,888 | A | 1/1999 | Lee | |
| 6,077,187 | A | 6/2000 | Suzuki et al. | |
| 6,219,608 | B1 | 4/2001 | Abo et al. | |
| 6,243,638 | B1 | 6/2001 | Abo et al. | |
| 6,811,504 | B2 * | 11/2004 | Korenjak et al. | 474/14 |
| 7,163,477 | B1 * | 1/2007 | Sherrod | 474/14 |
| 2005/0090367 | A1 | 4/2005 | Jonsson et al. | |
| 2005/0096822 | A1 | 5/2005 | Aoki | |
| 2005/0255957 | A1 | 11/2005 | Miller et al. | |

FOREIGN PATENT DOCUMENTS

| | | |
|---|---|---|
| EP | 0 701 073 A3 | 10/2000 |
| EP | 0 931 228 B1 | 10/2002 |
| JP | 62159847 A * | 7/1987 |

OTHER PUBLICATIONS

J. Singh et al., "General Motors "VTi" Electronic Continuously Variable Transaxle," *Transmission & Driveline Systems Symposium 2003*, SAE International, © 2003, pp. 99-106.

* cited by examiner

DEVICES FOR ELECTRICALLY ASSISTING AND ACTUATING CONTINUOUSLY VARIABLE TRANSMISSIONS

CROSS REFERENCE TO RELATED APPLICATION

This application claims the benefit of U.S. Provisional Patent Application Ser. No. 60/676,904, filed May 2, 2005.

TECHNICAL FILED OF THE INVENTION

This invention relates generally to transmissions, and more particularly to methods and apparatus for actuation of continuously variable transmissions.

BACKGROUND OF THE INVENTION

Transmissions are devices that transform the speed and torque in vehicles using gears, belts, or other drive components. Most transmission designs use discrete speed ratios: low ratios for acceleration, hill climbing, and heavy hauling, and high ratios for higher-speed travel. They use multiple parallel gear sets between input and output shafts. By changing which gear set carries the loads between the shafts, the speed ratio between the input and output shafts is altered.

Transmissions have also been designed that are continuously variable (CVTs). These generally use friction to transfer load from an input shaft to an output shaft. By altering the radial position of friction rollers, belts, or other components, the speed ratio is changed.

Figure 1:
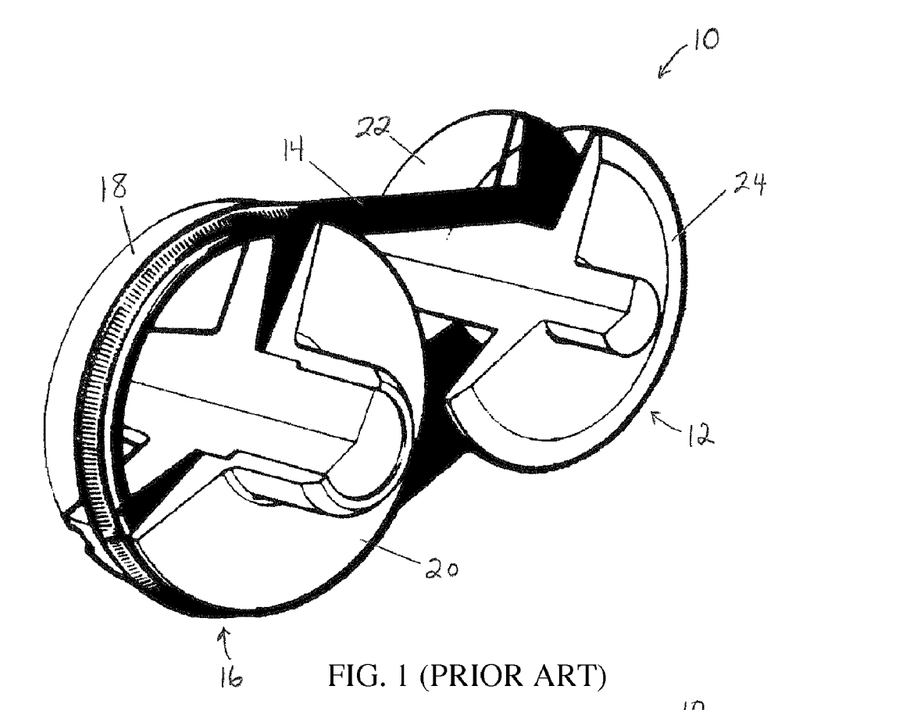
FIG. 1 is a perspective view of a continuously variable transmission of the prior art at a lower speed ratio.
Figure 2:
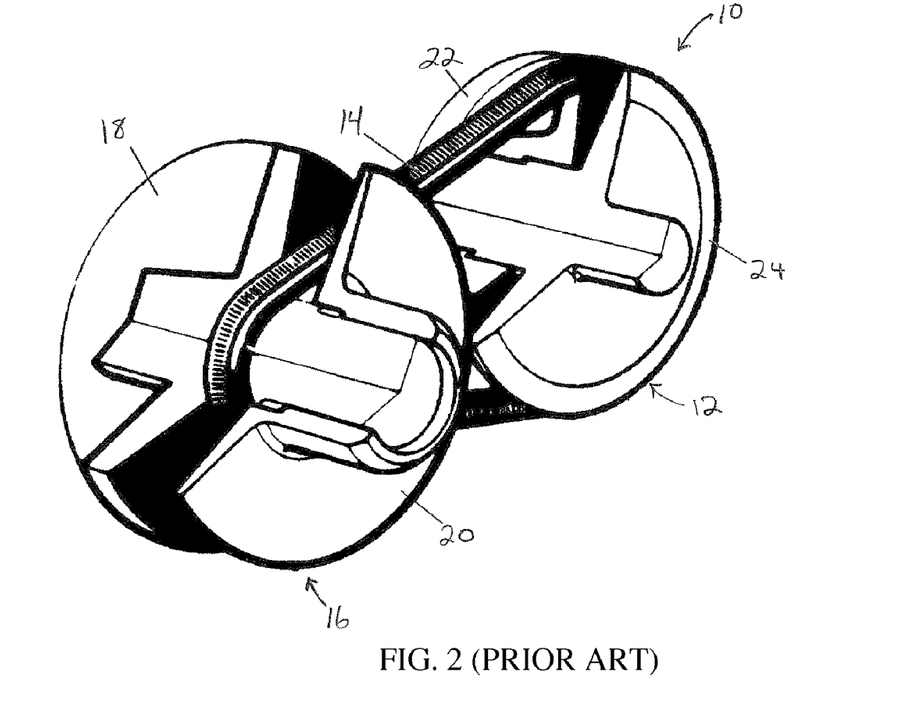
FIG. 2 is a perspective view of a continuously variable transmission of the prior art at a higher speed ratio.

A typical CVT design 10 is shown in FIGS. 1 and 2. It uses a driving (primary) pulley 12, a wide v-belt 14, and a driven (secondary) pulley 16. The speed ratio is adjusted by altering the width of the driving 12 and driven 16 pulleys, so that the v-belt 14 contacts at varying radii on the pulleys 12 and 16. FIG. 1 shows the CVT 10 operating at a lower speed ratio where the driving pulley halves 22 and 24 are separated and the v-belt 14 contacts the pulley halves 22 and 24 at a small radius. The driven pulley halves 18 and 20 are squeezed together by a spring under these conditions, forcing the belt 14 at the output end to contact at a large radius. This configuration offers maximum torque magnification and speed reduction. FIG. 2 shows the CVT operating in a higher speed ratio where the pulley halves 22 and 24 of the driving pulley 12 are positioned close together, forcing the v-belt 14 to contact the pulley halves 22 and 24 at a larger radius and increasing the velocity of the v-belt 14. The increased velocity of the v-belt 14 works against the spring force of the driven pulley 16, forcing the driven pulley halves 18 and 20 apart where the v-belt 14 contacts the driven pulley halves 18 and 20 at a smaller radius. This configuration offer maximum speed magnification.

Most current CVTs rely upon fixed-design mechanical or hydraulic actuation that cannot be easily changed to respond to differing demands, such as varying vehicle cargo loads and operator performance demands. Accordingly, there is need for a CVT actuation system that is more flexible and adaptable than the current state of technology.

SUMMARY OF THE INVENTION

According to one aspect of the present invention, an assist mechanism is provided for a mechanically-actuated continuously variable transmission with first and second pulleys interconnected by a belt. The first pulley is connected to an engine shaft and has a first pulley portion and a second pulley portion axially movable with respect to the first pulley portion. A first engagement means is provided for connection to the second pulley portion and an electric motor that has a second engagement means for coaxially engaging the first engagement means causes axial movement of the first engagement means when it is rotated. Rotation of the second engagement means with respect to the first engagement means axially moves the first engagement means so that the mechanism assists the mechanically-actuated continuously variable transmission in moving the second pulley portion with respect to the first pulley portion to change an axial spacing therebetween.

According to another aspect of the present invention, a method of electrically assisting a mechanically-actuated continuously variable transmission having first and second pulleys interconnected by a belt is provided. The first pulley is adapted for mounting on an engine shaft and has a first pulley portion and a second pulley portion axially movable with respect to the first pulley portion. A first engagement means is provided for connection to the second pulley portion and an electric motor having a second engagement means coaxially engaged with said first engagement means so as to move said first engagement means axially in response to rotation of said second engagement means with respect thereto is provided. Energizing the electric motor causes the second engagement means to move the first engagement means axially, so that it assists the mechanically-actuated continuously variable transmission in moving the second pulley portion with respect to the first pulley portion, changing an axial spacing therebetween.

According to a further aspect of the present invention, an electrically-assisted mechanically-actuated continuously variable transmission has a first pulley with a first pulley portion for fixed connection to an engine shaft, an axially movable second pulley portion for placement about the engine shaft, and a mechanical actuator connected to the second pulley portion. An electric motor is coaxially engaged with the second pulley portion such that it assists the mechanical actuator in moving the second pulley portion with respect to the first pulley portion to change spacing therebetween.

According to another aspect of the present invention, a variable actuator for a continuously variable transmission having first and second pulleys interconnected by a belt is provided, where the first pulley is connected to an engine shaft and has a first pulley portion and a second pulley portion axially movable with respect to the first pulley portion. A pair of disk for connection about the engine shaft is provided, with one being adapted for axially moving the second pulley portion. A roller having a spin axis and adapted to fit at least partially between the disks is supported by a roller support that is adapted to tilt the spin axis of the roller with respect to the axis of the disks, such that tilting the roller support during use rotates one disk with respect to the second pulley portion, axially moving the second pulley portion to change an axial spacing between the first and second pulley portions.

According to further aspect of the present invention, a method of actuating a continuously variable transmission having first and second pulleys interconnected by a belt is provided. The first pulley is adapted for mounting on an engine shaft and has a first pulley portion and an axially movable second pulley portion. A pair of disks are provided for connection about the engine shaft, with one being rotatably engaged with the second pulley portion so as to move the second pulley portion axially with respect to the first pulley portion in response to relative rotation between the disk and the second pulley portion. A roller having a spin axis and adapted to fit at least partially between the disks is provided. A roller support for tilting the spin axis of the roller with respect to the axis of the disks is also provided. Tilting the roller support causes one of the disks to rotate relative to the first pulley and thereby change an axial spacing between the first and second pulley portions.

According to an even further aspect of the present invention, a continuously variable transmission having a first pulley with a first pulley portion for fixed connection to an engine shaft and an axially movable second pulley portion for placement about the engine shaft is provided. The actuator has a first disk for fixed connection about the engine shaft and a second disk coaxially engaged with the second pulley portion to move the second pulley portion with respect to the first pulley portion when the second disk rotates with respect to the second pulley portion.

The objects and advantages of the present invention will be more apparent upon reading the following detailed description in conjunction with the accompanying drawings.

DESCRIPTION OF PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Figure 3:
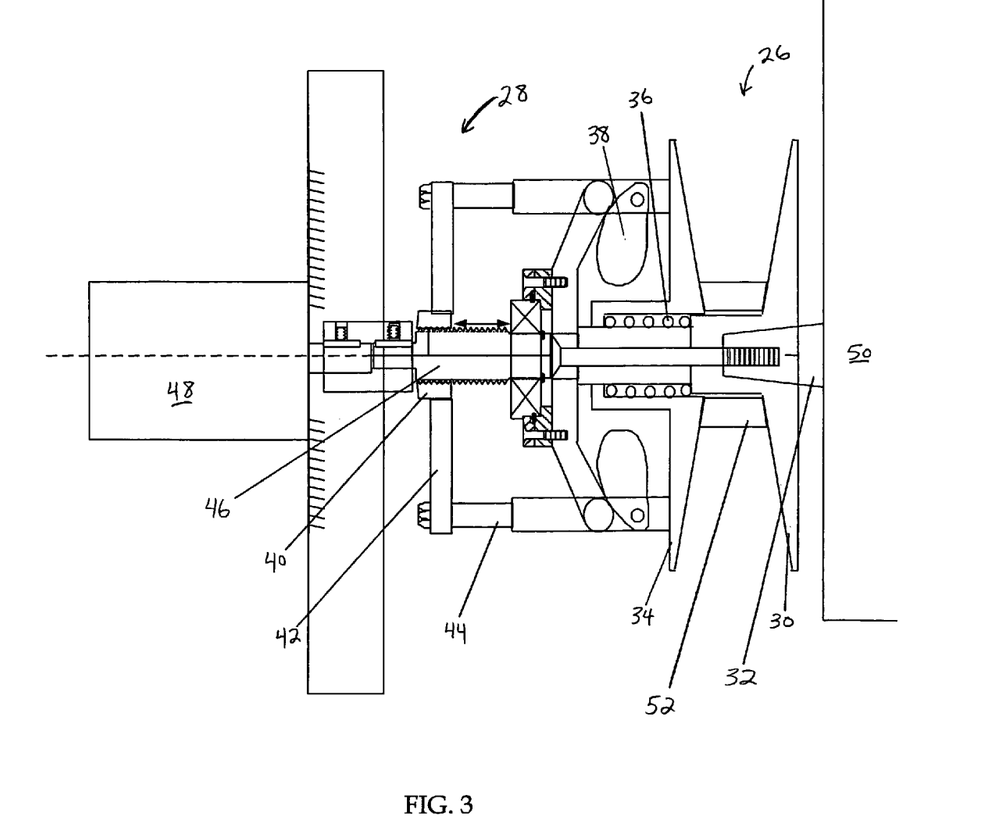
FIG. 3 is a cross-sectional view of a mechanically-actuated CVT having an assist mechanism in accordance with one embodiment of the present invention, in a lower speed ratio configuration.
Figure 4:
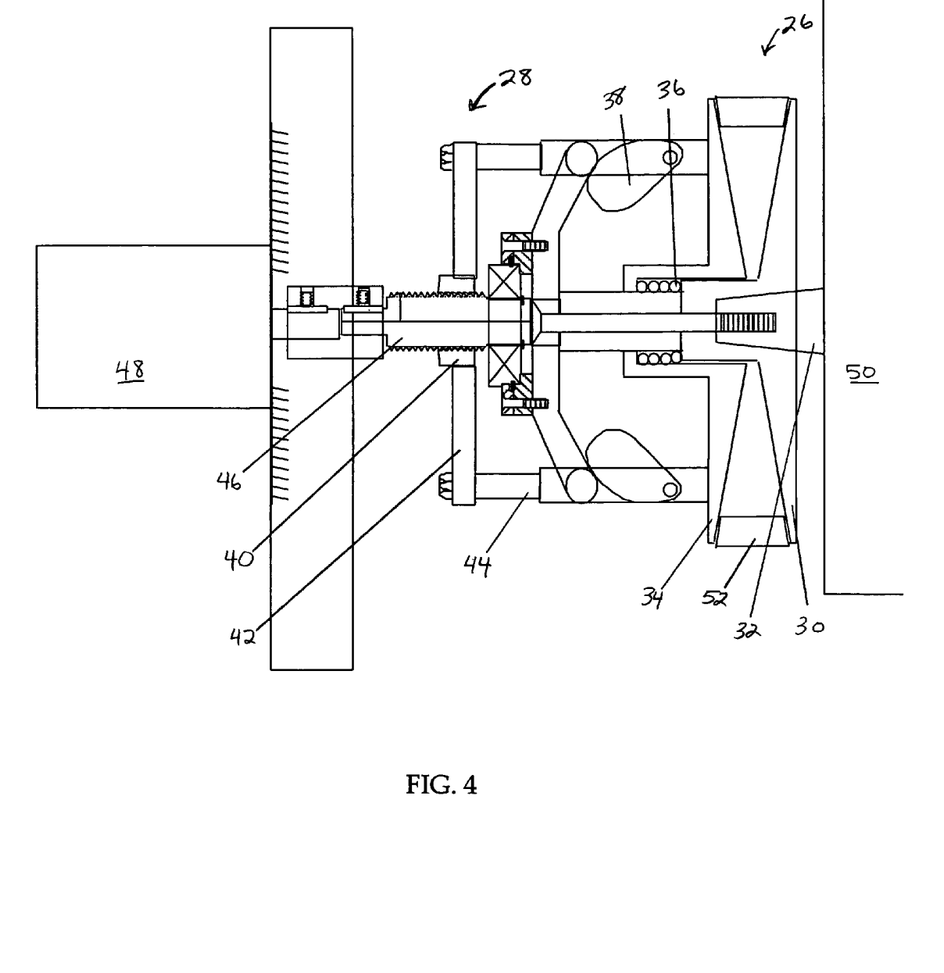
FIG. 4 is a cross-sectional view of the CVT of FIG. 3, shown in a higher speed ratio configuration.

FIGS. 3 and 4 show a pulley 26 and an assist mechanism 28 for assisting a mechanically-actuated continuously variable transmission (CVT), in accordance with one embodiment of the present invention, which adds to or subtracts from the mechanical actuation of the CVT. The pulley has a fixed pulley half or portion 30 that is fixed to engine shaft 32, and a movable pulley half or portion 34 that is axially movable with respect to the fixed pulley half in response to spring forces exerted by actuation spring 36 and movement of flyweights 38 during use.

The assist mechanism 28 includes a first engagement means 40, shown as a threaded aperture or nut that is positioned axially with respect to pulley 26 and connected to the moveable pulley half 34 by plate 42 and spacers 44, a second engagement means 46 engaging the nut, shown as a threaded shaft or screw, and an electric control motor 48, shown coaxially mounted with the engine shaft, outboard from the engine 50. The nut and screw combination preferably has a left-handed thread, but a right-handed thread may be used in certain applications.

During operation, the nut 40 and screw 46 normally rotate at the same rate as engine shaft 32 when no assistance in changing the axial spacing between the pulley halves 30 and 34 is initiated by the control system (described below). When the assist mechanism 28 is initiated to assist in moving the pulley 26 to a lower speed ratio position, as shown in FIG. 3, the control motor 48 slows rotation of the screw, which causes the nut to pull the movable pulley half away from the fixed pulley half. This assists the actuation spring 36 and flyweights 38 in increasing the axial spacing between the pulley halves, allowing the belt 52 to contact the pulley at a small radius. When the assist mechanism is initiated to assist in moving the pulley to a higher speed ratio position, as shown in FIG. 4, the control motor rotates the screw faster than the engine shaft, which causes the nut to push the movable pulley half toward the fixed pulley half. This assists in decreasing the axial spacing between the pulley halves, forcing the belt to contact the pulley at a large radius.

Figure 5:
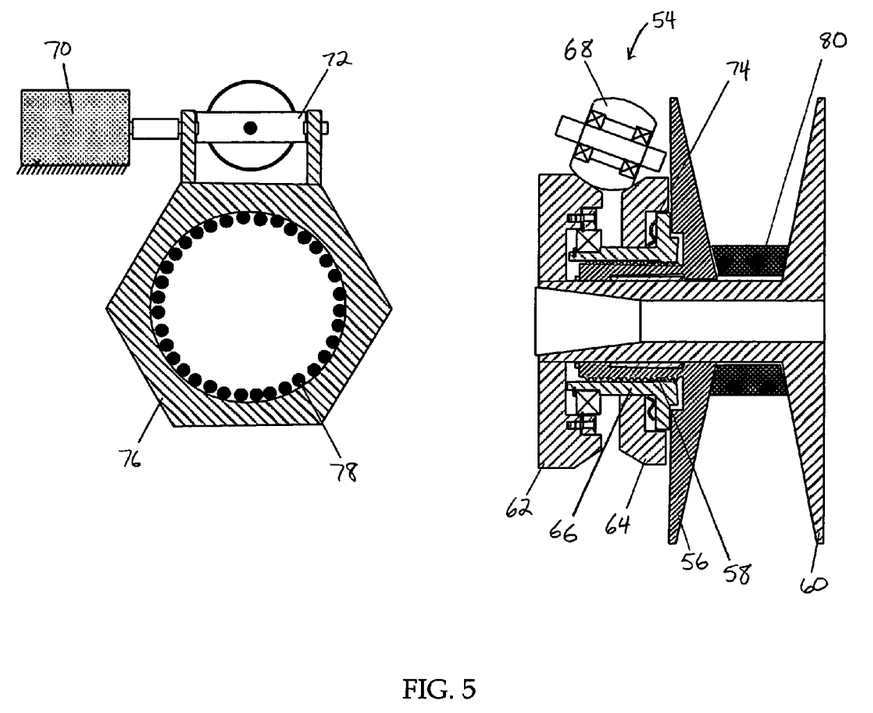
FIG. 5 is a cross-sectional view of an embodiment of a variable actuator in accordance with the present invention, in a lower speed ratio configuration.
Figure 6:
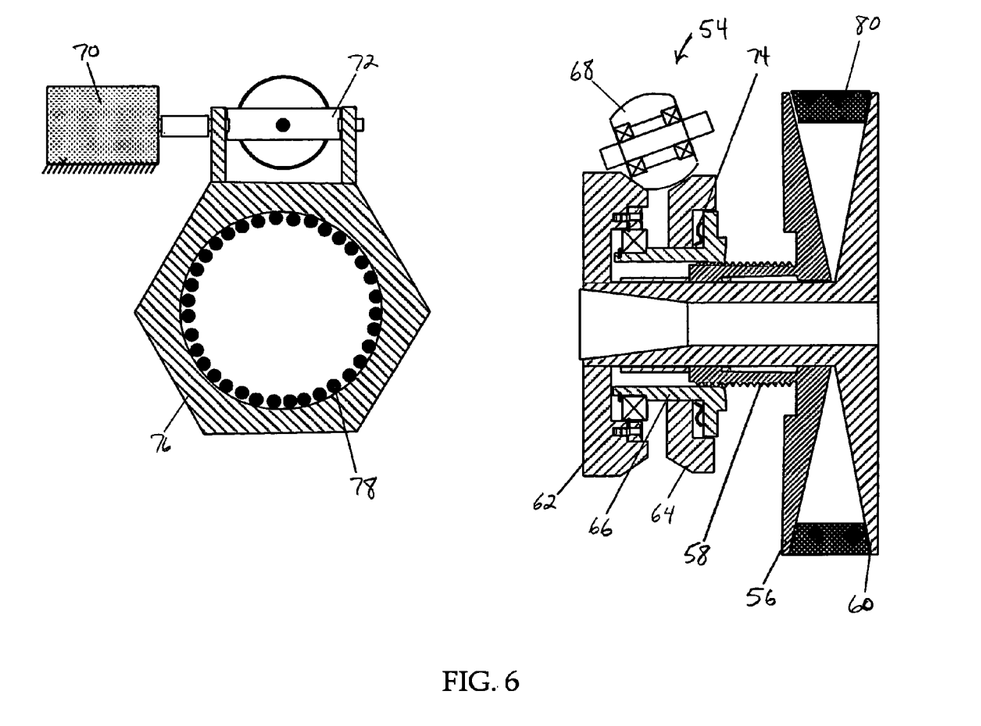
FIG. 6 is a cross-sectional view of the variable actuator of FIG. 5, shown in a higher speed ratio configuration.

Another aspect of the present invention involves a variable actuator for actuating a CVT having a pulley with a fixed pulley half and a movable pulley half. FIGS. 5 and 6 show one embodiment of the variable actuator 54 in accordance with the present invention, where the movable pulley half 56 has a threaded portion 58. The threaded portion may alternatively be incorporated into the fixed pulley half 60 in certain applications.

The actuator 54 shown includes a first disk 62 fixed to the fixed pulley half 60, a second disk 64 adjacent the first, a nut 66 engaged with the threaded portion 58 of the movable pulley half 56, a roller 68 positioned adjacent the disks, an electric control motor 70 coupled to a roller support yoke 72, and a wave washer 74 positioned between the second disk and the nut. The disks are preloaded against the roller by the wave washer, which is a compliant spring that is sized to provide enough tractive force to prevent the roller from slipping on the disks, and to actuate the pulley halves in opposition to forces in the system. Yoke 72 is rotatably mounted on the motor shaft, and roller 68 is rotatably mounted in the yoke with its spin axis perpendicular to the axis of the motor shaft and yoke. The spin axis of the roller is normally parallel to the engine shaft axis, but its inclination angle is controlled by the motor through the yoke 72. That is, the motor turns the yoke and thereby tilts the spin axis of the roller. The yoke is held in place by ring 76 and rollers 78 that fit into the annular space between the disks.

During operation, the second disk 64 and nut 66 of the actuator 54 normally rotate at the same rate as the engine shaft (not shown) when no change in axial spacing between the pulley halves 60 and 62 is initiated by the control system. When the actuator is actuated to move the pulley to a lower speed ratio position, as shown in FIG. 5, the control motor 70 tilts the axis of roller 68 so that the roller slows rotation of the second disk, causing the nut to rotate and pull the movable pulley half away from the fixed pulley half. This allows the belt 80 to contact the pulley at a small radius, as shown. When the actuator is actuated to move the pulley to a higher speed ratio position, as shown in FIG. 6, the control motor tilts the roller axis so that the roller rotates the second disk faster than the engine shaft, which causes the nut to rotate and push the movable pulley half toward the fixed pulley half. This forces the belt to contact the pulley at a large radius, as shown.

An advantage of the embodiment shown in FIGS. 5 and 6 is that the power requirements for the control motor are much less than the power requirements for the assist mechanism shown in FIGS. 3 and 4. The majority of the power needed to shift the pulley halves comes from the engine, and the control motor provides only the small amount of power needed to tilt the roller on the disks.

Figure 7:
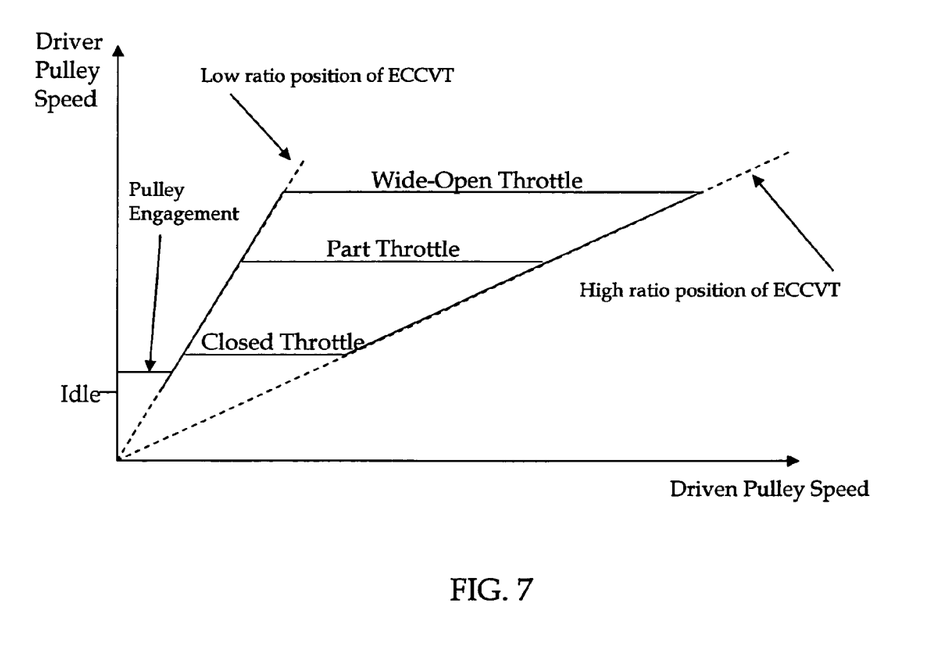
FIG. 7 graphically illustrates one example of a control strategy that may be used in accordance with the present invention.

With either embodiment, a control system may use throttle position to set a desired engine speed and then adjust the speed ratio of the CVT as necessary to maintain the desired engine speed. One example control strategy is shown graphically in FIG. 7. A given throttle position determines an engine speed setpoint, and the control system determines a desired CVT ratio based on the difference between that setpoint and the actual engine speed. For example, the CVT may start with a low ratio (steep slope in FIG. 7), and then, if vehicle speed increases and the engine speed correspondingly increases, the control system upshifts the CVT toward a higher speed ratio (shallower slope in FIG. 7) to increase the load on the engine thereby tending to hold the engine speed relatively constant. For a fixed throttle setting, e.g., part throttle, the control system may cause the CVT speed ratio to continuously vary with vehicle speed, from the low ratio end to the high ratio end of the "part throttle" horizontal line on the graph, while the engine speed stays relatively constant. If the engine speed drops below the setpoint, due to increased load from climbing a hill, for example, the control system downshifts the CVT ratio toward a lower speed ratio (steeper slope in FIG. 7.) to decrease the load on the engine and thereby, again, tends to hold the engine speed relatively constant. If desired, the engine speed setpoint may be based on throttle position and on vehicle speed such that engine speed is allowed to increase somewhat with vehicle speed. One example control system is disclosed in U.S. Pat. No. 4,811,225, which is hereby incorporated by reference.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An assist mechanism for a mechanically-actuated continuously variable transmission (CVT) having first and second pulleys interconnected by a belt, the first pulley connected to an engine shaft and having a first pulley portion and a second pulley portion axially movable with respect to the first pulley portion, said CVT including a centrifugal actuator configured to move said second pulley portion axially, said assist mechanism comprising:
   a first engagement means for connection to the second pulley portion, said first engagement means configured to cooperate with the centrifugal actuator; and
   an electric motor having a second engagement means for coaxially engaging said first engagement means and causing axial movement thereof when rotated,
   wherein rotation of said second engagement means with respect to said first engagement means axially moves said first engagement means, assisting the centrifugal actuator in moving the second pulley portion with respect to the first pulley portion to change an axial spacing therebetween,
   wherein said first engagement means is adapted for coaxial connection to the second pulley portion,
   wherein said electric motor is adapted for coaxial mounting with the first pulley, and
   wherein said second engagement means comprises a threaded shaft.

2. The assist mechanism of claim 1, wherein said first engagement means comprises a threaded aperture.

3. The assist mechanism of claim 2, wherein said first engagement means is axially and rotatably fixed with respect to the second pulley portion.

4. The assist mechanism of claim 2, wherein said first engagement means and said second engagement means are configured to normally rotate at the same rate as the engine shaft during operation.

5. The assist mechanism of claim 4, wherein said first engagement means is axially and rotatably fixed with respect to the second pulley portion.

6. A method of electrically assisting a mechanically-actuated continuously variable transmission having first and second pulleys interconnected by a belt, said first pulley adapted for mounting on an engine shaft and having a first pulley portion and a second pulley portion axially movable with respect to the first pulley portion, said method comprising:
   providing a first engagement means fixedly coaxially connected to the second pulley portion, said first engagement means being axially and rotatably fixed with respect to the second pulley portion;
   providing an electric motor having a second engagement means threaded to said first engagement means so as to move said first engagement means axially in response to rotation of said second engagement means with respect thereto; and
   energizing said electric motor to cause said second engagement means to move said first engagement means axially, assisting the mechanically-actuated continuously variable transmission in moving the second pulley portion with respect to the first pulley portion, changing an axial spacing therebetween.

7. The method of claim 6, wherein said electric motor is coaxially mounted with the first pulley.

8. The method of claim 6, wherein said first engagement means and said second engagement means normally rotate at the same rate as the engine shaft during operation.

9. An electrically-assisted mechanically-actuated continuously variable transmission, comprising:
   a first pulley having a first pulley portion for fixed connection to an engine shaft, and an axially movable second pulley portion for placement about the engine shaft;
   an automatic mechanical actuator connected to said second pulley portion; and
   an electric motor coaxially engaged with said second pulley portion, said electric motor assisting said mechanical actuator in moving said second pulley portion with respect to said first pulley portion to change spacing therebetween,
   wherein said second pulley portion has a first engagement means and said electric motor has a second engagement means threaded to said first engagement means, and
   wherein rotation of said second engagement means with respect to said first engagement means causes said first engagement means to move axially.

10. The transmission of claim 9, wherein any rotational difference between said first engagement means and said second engagement means causes said first engagement means to move axially.

11. The transmission of claim 9, wherein said first engagement means is axially and rotatably fixed with respect to the second pulley portion.

12. The transmission of claim 9, wherein said first engagement means and said second engagement means normally rotate at the same rate as the engine shaft during operation.

13. An electrically-assisted mechanically-actuated continuously variable transmission, comprising:
   a first pulley having a first pulley portion for fixed connection to an engine shaft, and an axially movable second pulley portion for placement about the engine shaft;
   an automatic mechanical actuator connected to said second pulley portion; and
   an electric motor coaxially engaged with said second pulley portion, said electric motor assisting said mechanical actuator in moving said second pulley portion with respect to said first pulley portion to change spacing therebetween,
   wherein said second pulley portion has a first engagement means and said electric motor has a second engagement means coaxially engaged with said first engagement means,
   wherein said first engagement means is axially and rotatably fixed with respect to the second pulley portion, and
   wherein said first engagement means is threaded to said second engagement means.

14. The transmission of claim 13, wherein rotation of said second engagement means with respect to said first engagement means causes said first engagement means to move axially.

15. The transmission of claim 13, wherein said first engagement means and said second engagement means normally rotate at the same rate as the engine shaft during operation.

16. An electrically-assisted mechanically-actuated continuously variable transmission, comprising:
   a first pulley having a first pulley portion for fixed connection to an engine shaft, and an axially movable second pulley portion for placement about the engine shaft;
   an automatic mechanical actuator connected to said second pulley portion; and
   an electric motor coaxially engaged with said second pulley portion, said electric motor assisting said mechanical actuator in moving said second pulley portion with respect to said first pulley portion to change spacing therebetween,
   wherein said automatic mechanical actuator is a centrifugal actuator, and
   wherein said second pulley portion has a first engagement means, said electric motor has a second engagement means coaxially engaged with said first engagement means, and said first engagement means is threaded to said second engagement means.

17. The transmission of claim 16, wherein rotation of said second engagement means with respect to said first engagement means causes said first engagement means to move axially.

18. The transmission of claim 16, wherein said electric motor has a second engagement means said first engagement means is axially and rotatably fixed with respect to the second pulley portion.

19. The transmission of claim 16, wherein said first engagement means and said second engagement means normally rotate at the same rate as the engine shaft during operation.

* * * * *